United States Patent [19]

Harbison et al.

[11] Patent Number: 5,599,751
[45] Date of Patent: Feb. 4, 1997

[54] ALKALINE EARTH MODIFIED GERMANIUM SULFIDE GLASS

[75] Inventors: Barry B. Harbison, Dunkirk, Md.; John M. Jewell, Taunton, Mass.; Celia I. Merzbacher, Alexandria; Ishwar D. Aggarwal, Fairfax Station, both of Va.

[73] Assignee: The United States of America as represented by the Secretary of the Navy, Washington, D.C.

[21] Appl. No.: 396,292

[22] Filed: Feb. 28, 1995

[51] Int. Cl.$^6$ .................. C03C 3/32; C03C 13/04; C03C 4/10
[52] U.S. Cl. ............... 501/40; 501/35; 501/37; 501/904
[58] Field of Search .............. 501/40, 904, 35, 501/37

[56] References Cited

U.S. PATENT DOCUMENTS

| | | | |
|---|---|---|---|
| 4,612,294 | 9/1986 | Katsuyama et al. | 501/40 |
| 4,704,371 | 11/1987 | Krolla et al. | 501/40 |
| 4,942,144 | 7/1990 | Martin | 501/40 |
| 4,962,995 | 10/1990 | Andrews et al. | 350/96.34 |
| 5,315,434 | 5/1994 | Mizuno et al. | 359/355 |
| 5,378,664 | 1/1995 | Becker et al. | 501/40 |
| 5,379,149 | 1/1995 | Snitzer et al. | 501/37 |
| 5,392,376 | 2/1995 | Aitken et al. | 385/144 |
| 5,398,584 | 2/1995 | Aitken et al. | 501/40 |
| 5,486,495 | 1/1996 | Jewell et al. | 501/10 |

*Primary Examiner*—Mark L. Bell
*Assistant Examiner*—Louis M. Troilo
*Attorney, Agent, or Firm*—Thomas E. McDonnell; George A. Kap

[57] ABSTRACT

A sulfide glass with improved mechanical and optical properties such as extended transmission in the infrared region of radiation having wavelengths of up to about 15 microns; Tg in the region of 410°–550° C.; and thermal stability of 100°–300° C. based on the difference between $T_g$ and $T_x$, comprising, on mol basis, 20–90% germanium sulfide, 0–60% gallium sulfide, and 5–60% of at least one modifier in sulfide form. A process for improving mechanical and optical properties of a sulfide glass based on gallium sulfide and/or germanium sulfide comprises the steps of mixing glass components, including a modifier in elemental or sulfide form; melting the glass components to form a molten mixture; cooling the molten glass mixture to a solid state; annealing the solid glass; and cooling the annealed glass to about room temperature. The glass components can be in elemental form or in the form of sulfides, and if in elemental form, then sufficient amount of sulfur is added to form sulfides of the glass components.

20 Claims, No Drawings

ALKALINE EARTH MODIFIED GERMANIUM SULFIDE GLASS

FIELD OF INVENTION

This invention pertains to a sulfide glass containing alkaline earth sulfide and germanium sulfide and to a process for improving properties thereof.

BACKGROUND OF INVENTION

Sulfide glasses based on gallium sulfide and/or germanium sulfide have been modified to improve their properties with either alkali metal sulfides or rare earth sulfides. These two families of sulfide glasses have opposite thermal properties. The sulfide glasses modified with alkali metal sulfides have glass transition temperature (Tg) of less than about 300° C. and glass stability, measured as the difference between Tg and crystallization temperature ($T_x$), of about 60°–130° C. The sulfide glasses modified with alkali metal sulfides are also hygroscopic. The sulfide glasses modified with rare earth sulfides have Tg in excess of about 550° C. but glass stability of only about 50° to 130° C. The low glass stability of the sulfide glasses modified with rare earth sulfides reduces their glass-forming ability. Furthermore, the two families of the sulfide glasses transmit light but only up to about 9 microns.

A sulfide glass is needed that has improved physical and optical properties.

SUMMARY OF INVENTION

It is an object of this invention to provide a sulfide glass that has broadband transmission up to about 15 microns.

Another object of this invention is a sulfide glass which has higher Tg, better stability in terms of the difference between Tx and Tg, and a longer light transmitting range, when compared to known sulfide glasses.

Another object of this invention is a process for improving physical and optical properties of a sulfide glass.

These and other objects of this invention are attained by a sulfide glass containing an effective amount of a modifier selected from alkaline earths, yttrium, lanthanum, zirconium, hafnium or a mixture of two or more of the elements or sulfides thereof. These and other objects of this invention are attained by a process for improving physical and optical properties of a sulfide glass by mixing with the glass components one or more of the modifiers.

DETAILED DESCRIPTION OF INVENTION

This invention pertains to a modified sulfide glass and to a process for making same. The glass has increased glass transition temperature, greater stability ($T_x$-$T_g$), and extened transmission to longer wavelength.

The sulfide glass of this invention contains gallium sulfide and/or germanium sulfide and also contains one or more modifiers selected from alkaline earth sulfides, yttrium sulfide, indium sulfide, lanthanum sulfide, zirconium sulfide, and hafnium sulfide. The preferred modifiers are barium sulfide, yttrium sulfide, indium sulfide and lanthanum sulfide. At least a portion of germanium sulfide can be substituted by lanthanum sulfide, zirconium sulfide, hafnium sulfide, or a mixture thereof. Lanthanum sulfide can replace up to about one-half of germanium sulfide, on a molar basis. Barium sulfide, when present in the composition, can be totally replaced by calcium sulfide, strontium sulfide or a mixture thereof. Another embodiment of the glass of this invention also contains a small amount of an optically active rare earth sulfide. The rare earth sulfides of lanthanum and yttrium are not optically active. Preferred rare earth sulfides include praseodymium sulfide, neodymium sulfide, erbium sulfide, cerium sulfide, dysprosium sulfide, holmium sulfide, thulium sulfide and terbium sulfide.

In the sulfide glass of this invention, on molar basis of principal components, amount of germanium sulfide, is 20–90%, preferably about 30–70%; amount of gallium sulfide is 0–60%, preferably about 5–30%; and amount of a modifier is 5–60%, preferably about 10–50%. Amount of optically active rare earth sulfide in the glass of this invention, if added, can vary up to about 5%, preferably 0.01–2%, on a molar basis. If too much of a rare earth sulfide is added, emission efficiency of the glass is negatively impacted. Other conventional components can be present in the glass of this invention which do not substantially affect properties thereof.

The sulfide glass of this invention has improved physical and optical properties compared to prior art sulfide glasses based on gallium sulfide and/or germanium sulfide. The improvements realized include higher glass transition temperature (Tg); thermal stability, as measured by the difference between crystallization temperature (Tx) and glass transition temperature (Tg); and greater transmission range. For the sulfide glass of this invention, Tg is greater than about 410° C., such as in the range of 410°–550° C., typically about 450° C.; thermal stability exceeds about 100° C., and is in the range of 100°–300° C. typically about 200° C.; and transmission of light in the infrared region is extended up to about 15 microns, and is typically in the range of 0.3–12 microns. These glasses are also characterized by low energy multiphonon absorption. Presence of an optically active rare earth sulfide results in a negligible effect on physical and optical properties, however, its presence in the glass can result in stimulated emission of light. This renders the glass useful in certain applications which would be difficult or impossible in absence of an optically active rare earth sulfide.

Process for improving physical and optical properties of a sulfide glass and process for making the sulfide glass of this invention includes the steps of mixing components of the glass of this invention, melting the components to form molten glass, cooling the molten glass to solidify same, and annealing the glass to relieve stresses therein in order to make it stronger.

Mixing of the components is done in a drybox maintained at less than about 1 ppm moisture and oxygen and under an inert atmosphere. Highly purified components are used in order to enhance transmission. It is preferred to use components in elemental form rather than in the salt form, i.e., as sulfides, since this leads to a glass with less impurities. All components can be purchased in the desired purity of in excess of 99.9%, on metals basis. Sulfur is presently available at a purity of about 99.995% which is further refined by distillation to remove water, oxides and carbon.

The mixing step is carried out in a drybox by first weighing out the components and then mixing them to distribute the components. The weighing and mixing steps are carried out in a drybox under an inert atmosphere because sulfur is hygroscopic and the alkaline earths, yttrium, zirconium, lanthanum and hafnium are highly flammable in the presence of water or oxygen. Germanium, gallium and indium are not a problem in this respect. If rare earth sulfide is used in the composition, this is when the addition thereof is made, either as a rare earth sulfide or as elemental rare earth together with sulfur.

If elemental glass components are used, sulfur is included separately and forms sulfides by reacting with the other elemental glass components upon heating. The elements are weighed out and mixed in the drybox and then transferred to a receptacle which was previously cleaned and outgassed.

After transferring the glass components into the receptacle, the receptacle is closed-off and taken out of the drybox. At this point, the receptacle can be at about room temperature. After taking the receptacle out of the drybox, the receptacle is heated to melt the contents thereof and to create an environment which promotes the reaction of sulfur with the other elemental components to form sulfides at high temperature. Typical melting schedule involves ramping from about room temperature to about 825° C. at a rate of about 10° C. per minute, holding at about 825° C. for about ¼ to ½ hour, ramping from about 825° C. to about 1000° C. at a rate of about 5° C. per minute and holding at about 1000° C. for about 10 to 20 hours. After heating to the high temperature of about 1000° C., contents of the receptacle are in a liquid state and further mixing of the components takes place at the high temperature to more uniformly disperse them throughout the molten glass.

After the melting process, the molten glass is quickly cooled from about 750°–1000° C. to about Tg or below in order to solidify the glass. Annealing of the glass is accomplished after solidification by extended heating thereof in solid state at slightly above Tg in order to relieve stresses in the glass which may cause cracking/fracture. The glass is then characterized by powder x-ray diffraction and thermal analysis which is used to confirm glass formation.

The sulfide glass thus formed varies in color from pale yellow to black and can have transmission of above about 50% for a thickness of 0.75 mm over the range from about 0.3 up to about 12 microns. Presence of hydrogen sulfide in the glass results in some absorption at about 4 microns. Its hardness exceeds or is comparable to that of zinc sulfide.

If the additive is used in the sulfide form, it is then not necessary to heat very slowly to react elemental sulfur with an elemental metal to form the sulfide salt. Slow heating allows the sulfur to fully react with the metal before generating explosive pressures which free sulfur exerts at high temperature. In the event the sulfide salt is used, higher levels of oxide and hydroxide impurities are incorporated into the glass thus reducing broadband transmission by associated absorptions.

Principal applications for the sulfide glass of this invention include optical fibers and domes/windows. Due to its enhanced stability and extended transmission in the infrared region, the glass of this invention can be used to make optical fibers which can be used to detect chemical species which absorb in the infrared, such as toxins in water, dumps or anywhere else where detection of a chemical species is desired. Due to the extended transmission range in the infrared region, optical fibers made from the novel sulfide glass disclosed herein, are capable of detecting more chemical species than prior art sulfide glasses. Many glasses can transmit radiation in the region of about 3–5 microns, however, the sulfide glass disclosed herein can detect radiations in the range of up to about 15 microns. This, of course, includes transmission in the 3–5 micron and in the 8–12 micron regions. For instance, sulfur dioxide absorption can be detected at about 4 microns and ethylene absorpion can be detected at about 10.5 microns. The glass of this invention is the only sulfide glass which can detect both sulfur dioxide and ethylene.

The glass of this invention is particularly suitable for the dome/window applications on aircraft traveling up to about Mach IV. In such applications, paramount properties include broadband infrared transparency, good mechanical properties such as high hardness and fracture toughness, and chemical stability with respect to moisture and heating in air. The glass of this invention is at least comparable and in many instances exceeds these and other relevant properties of zinc sulfide. It should be pointed out that a hot body emits maximum radiation at sea level in the approximate range of 3–5 microns whereas a cold body emits maximum radiation at sea level in the approximate range of 7–14 microns. This property is of particular importance in connection with smart bombs the successful use of which requires detection of radiation from hot and cold bodies.

Another important application for the glass of this invention is as optical fibers which can provide higher efficiency fiber lasers and amplifiers. The current fiber laser/amplifier materials are based on oxide or fluoride glasses which have high multiphonon absorptions at shorter wavelengths of about 2–4 microns and hence, more probable to undergo non-radiative decay. The sulfide glasses of this invention offer the potential for better laser/amplifier host materials for the optically active rare earth ions by having longer wavelength multiphonon absorptions resulting in lower probability of non-radiative losses and the potential for greater excited state lifetimes.

The invention having been generally described, the following example is given as a particular embodiment of the invention to demonstrate the practice and advantages thereof. It is understood that the example is given by way of illustration and is not intended to limit in any manner the specification or any claim that follows.

EXAMPLE

This example demonstrates preparation of a sulfide glass based on gallium sulfide and germanium sulfide which glass also contained additives barium sulfide and indium sulfide.

A silica glass ampoule had a wall thickness of 3 mm, had one opening and contained a vitreous carbon crucible within. The ampoule was washed with dilute nitric acid and dried in an oven maintained at 110° C. The open end of the ampoule was then hooked up to a vacuum system consisting of a turbomolecular and mechanical pump. While the ampoule was evacuated, it was also heated using an oxygen-methane torch for about one hour until a constant vacuum was reached, indicating absence of moisture and any other gas. The evacuated ampoule at a vacuum of $1 \times 10^{-6}$ Torr was then sealed with a valve and positioned within a drybox wherein the atmosphere contained less than 1 ppm water vapor and oxygen.

The elemental glass components in particulate form were weighed in the drybox to provide the glass composition on molar basis of $(BaS)_{42.9}(In_2S_3)_{8.5}(Ga_2S_3)_{8.5}(GeS_2)_{40.1}$. Purity of the elements on metals basis, in weight percent, was 99.9% for barium, 99.99999% for indium, 99.99999% for gallium, and 99.9999% for germanium. Sulfur was obtained at a purity of 99.995%, however, it was further purified by distilling it three times to remove water vapor, oxides and carbon. After distillations, purity of sulfur was greater than 99.995%, and it was at this purity that it was used in the drybox. The total weight by this glass composition batch was 40 grams. An additional one percent by weight, or 0.40 gram, of sulfur was added to provide for volatilization losses during melting. The 40 gram batch consisted of 13.45 grams barium, 4.46 grams indium, 2.71 grams gallium, 6.65 grams germanium, and 13.15 grams sulfur.

The glass composition batch was then mixed for about 5 minutes with a spatula and loaded into the crucible within the ampoule. The ampoule was then sealed by means of the valve, removed from the drybox and hooked up to the vacuum system. The ampoule was evacuated for about an hour and then sealed with an oxygen-methane torch. The sealed ampoule was then placed into a furnace and the temperature in the furnace was thereafter ramped at 1° C. per minute to 1000° C., held at that temperature for 18 hours and then quenched in water. The glass components in the ampoule were solid when the ampoule was being heated but then became liquid at about 800° C. and then turned solid when the ampoule was quenched in water to about its Tg. After quenching, the glass was annealed at about 475° C. for an hour and then cooled slowly at 1° C. per minute to room temperature.

The resulting sulfide glass had Tg of 445° C.; Tx of 633° C. with crystallization onset at 607° C.; hardness of 233.2 kg/mm$^2$; and absorption of 1.7 cm$^{-1}$ at 10 microns. This glass had absorption of less than 10cm$^{-1}$ over the range of 0.3–14 microns.

A control sulfide glass component of 75 mol percent germanium sulfide and 25 mol percent gallium sulfide, prepared similarly to the above procedure, had Tg of 381.3° C. and Tx of 454.5° C.

Samples of the sulfide glass were prepared in the general manner described above with results given in Table I, below. Sample 17 corresponds to the example given above. In Table I, amounts of the glass components are given in mol percent and the glass components were gallium sulfide (Ga$_2$S$_3$), germanium sulfide (GeS$_2$), barium sulfide (BAS), yttrium sulfide (Y$_2$S$_3$), indium sulfide (In$_2$S$_3$), strontium sulfide (SrS), calcium sulfide (CaS), and lanthanum sulfide (LaS). Glass components in Samples 7 to 21 were used in elemental form and glass components in Samples 1 to 6 were in sulfide form. Higher oxide impurities present in the sulfide salts produced glasses with higher values for T$_x$ and T$_g$ than glasses of similar composition made from the elements.

In sample 7 of Table 1, above, where praseodymium is given as 1%, it was hatched as a one weight percent addition to the base melt. Occasionally, glass samples shattered when quenching and bulk measurements of hardness and absorptions were not determined. The asterisked (*) samples were partially crystalline.

Many modifications and variations of the present invention are possible in light of the above techniques. It is, therefore, to be understood that within the scope of the appended claims, the invention may be practiced otherwise than as specifically described.

What is claimed is:

1. A sulfide glass substantially free of crystallites comprising, on mol basis, 30–65% germanium sulfide, 0–30% gallium sulfide and 30–60% of a modifier in sulfide form which imparts to the glass improved Tg, improved thermal stability, or extended transmission in the infrared range when compared to a sulfide glass devoid of said modifier.

2. The glass of claim 1 wherein amount of germanium sulfide is at least 30%, amount of gallium sulfide is 5–20%, and amount of said modifier is at least 30%; transmission of said glass is over the range of up to about 15 microns.

3. The glass of claim 2 wherein said modifier is selected from the group consisting of alkaline earth sulfides, yttrium sulfide, lanthanum sulfide, zirconium sulfide, hafnium sulfide, indium sulfide, and mixtures thereof.

4. The glass of claim 3 including up to about 5%, on mol basis, of at least one optically active rare earth sulfide to provide quantum efficiencies of about 2–99% for stimulated emission; said glass having T$_g$ greater than about 410° C. and thermal stability exceeding about 100° C., as measured by the difference between T$_g$ and T$_x$.

5. The glass of claim 2 wherein said modifier is selected from the group consisting of barium sulfide, strontium sulfide, calcium sulfide, yttrium sulfide, indium sulfide, lanthanum sulfide, and mixtures thereof.

6. The glass of claim 3 including, on mol basis, 0.01–2% of an optically active rare earth sulfide selected from the group consisting of praseodymium sulfide, neodymium sulfide, erbium sulfide, terbium sulfide, thulium sulfide, cerium sulfide, holmium sulfide, dyprosium sulfide, and mixtures thereof; in said glass, purity of germanium in said germa-

TABLE I

| Sample No. | BaS | Ga$_2$S$_3$ | GeS$_2$ | Y$_2$S$_3$ | In$_2$S$_3$ | SrS | CaS | LaS$_{1.5}$ | Pr | T$_g$ °C. | T$_x$ °C. | Hardn. kg/mm$^2$ | Absorp. @ 10 um cm$^{-1}$ |
|---|---|---|---|---|---|---|---|---|---|---|---|---|---|
| 1 | 32.5 | 12.5 | 55.0 | 0 | 0 | 0 | 0 | 0 | 0 | 435 | 548 | 261.2 | 28 |
| 2 | 16.25 | 12.5 | 55.0 | 16.25 | 0 | 0 | 0 | 0 | 0 | 463 | 598 | 182.3 | 23 |
| 3* | 21.45 | 17.0 | 40.1 | 21.45 | 0 | 0 | 0 | 0 | 0 | 490 | 644 | — | 76 |
| 4 | 32.5 | 6.25 | 55.0 | 0 | 6.25 | 0 | 0 | 0 | 0 | 420 | 575 | 239.8 | 9 |
| 5 | 42.9 | 17.0 | 40.1 | 0 | 0 | 0 | 0 | 0 | 0 | 486 | 666 | 263.8 | 20 |
| 6 | 32.5 | 12.5 | 55.0 | 0 | 0 | 0 | 0 | 0 | 0 | 473 | 701 | 240.0 | 20 |
| 7 | 42.9 | 17.0 | 40.1 | 0 | 0 | 0 | 0 | 0 | 1% | 455 | 571 | 274.6 | 10 |
| 8 | 32.5 | 0 | 55.0 | 0 | 12.5 | 0 | 0 | 0 | 0 | 414 | 588 | 213.7 | 6 |
| 9 | 42.9 | 8.50 | 40.1 | 0 | 8.50 | 0 | 0 | 0 | 0 | 445 | 633 | 233.2 | 4 |
| 10 | 16.25 | 12.5 | 55.0 | 0 | 0 | 16.25 | 0 | 0 | 0 | 421 | 618 | 254.2 | 14 |
| 11 | 0 | 12.5 | 55.0 | 0 | 0 | 32.5 | 0 | 0 | 0 | 413 | 690 | 252.9 | 7 |
| 12 | 0 | 12.5 | 55.0 | 0 | 0 | 0 | 32.5 | 0 | 0 | 411 | 578 | 100 | 10 |
| 13* | 22.5 | 22.5 | 55.0 | 0 | 0 | 0 | 0 | 0 | 0 | 358 | 521 | — | — |
| 14* | 5.0 | 5.0 | 90.0 | 0 | 0 | 0 | 0 | 0 | 0 | 386 | 512 | — | — |
| 15* | 30.0 | 30.0 | 40.0 | 0 | 0 | 0 | 0 | 0 | 0 | 516 | ≧600 | — | — |
| 16* | 50.0 | 25.0 | 25.0 | 0 | 0 | 0 | 0 | 0 | 0 | 414 | 547 | — | — |
| 17 | 42.9 | 8.5 | 40.1 | 0 | 8.5 | 0 | 0 | 0 | 0 | 471 | 641 | 223.3 | 1.7 |
| 18 | 25.0 | 10.0 | 65.0 | 0 | 0 | 0 | 0 | 0 | 0 | 429 | 601 | 229.3 | 5 |
| 19* | 42.19 | 8.5 | 40.1 | 0 | 8.5 | 0 | 0 | 0 | 0 | 473 | 0 | 228.3 | 2.8 |
| 20 | 32.5 | 12.5 | 27.5 | 0 | 0 | 0 | 0 | 27.5 | 0 | 549 | 720 | 272.7 | 5.1 |
| 21* | 32.5 | 12.5 | 55.0 | 0 | 0 | 0 | 0 | 0 | 0 | 395 | 544 | — | 2.5 | nium sulfide is about 99.9999%, purity of gallium in said gallium sulfide, if present, is about 99.99999%, purity of the alkaline earth is about 99.9%, and purity of sulfur in said sulfides present is greater than 99.995%, if elemental components are used.

7. The glass of claim 3 including, on mol basis, 0.01–2% of praseodymium sulfide; said glass having Tg greater than about 410° C.; thermal stability, as measured by the difference between Tg and Tx, exceeding about 100° C.; and transmission of radiation having wavelength of up to about 15 microns.

8. The glass of claim 5 having Tg of 410°–550° C.; thermal stability, as measured by the difference between Tg and Tx, of 100°–300° C.; and transmission of radiation having wavelength in the range of 0.3–12 microns.

9. A process for making sulfide glass substantially free of crystallites comprising the steps of mixing particulate glass components, melting the glass components to form a molten mixture, cooling the molten glass mixture to a solid state, annealing the glass in solid state, and slowly cooling the annealed glass to about room temperature; the glass components comprise, on mol basis, 30–65% germanium sulfide, 0–30% gallium sulfide, and 30–60% of a modifier in sulfide form; or the glass components can be in elemental form in amount approximately equivalent to their sulfide form.

10. The process of claim 9 wherein amount of germanium sulfide is at least 30%, amount of gallium sulfide is 5–20%, and amount of the modifier in sulfide form is at least 30%; or the glass components can be in elemental form in amount approximately equivalent to their sulfide form.

11. The process of claim 10 wherein said modifier is selected from the group consisting of alkaline earths, yttrium, lanthanum, zirconium, hafnium, sulfides thereof, and mixtures thereof.

12. The process of claim 11, wherein said mixing step includes mixing up to about 5%, on mol basis of the glass components, of at least one rare earth additive selected from the group consisting of elemental rare earths, rare earth sulfides, and mixtures thereof.

13. The process of claim 12 wherein said modifier is selected from the group consisting of barium, strontium, calcium, yttrium, indium, lanthanum, sulfides thereof, and mixtures thereof.

14. The process of claim 10 wherein said modifier is selected from the group consisting of barium, strontium, calcium, yttrium, indium, lanthanum, sulfides thereof, and mixtures thereof.

15. The process of claim 14, wherein said mixing step includes mixing 0.01–2%, on mol basis, additive selected from the group consisting of praseodymium, neodymium, erbium, terbium, holmium, dysprosium, thulium, sulfides thereof, and mixtures thereof.

16. The process of claim 14 wherein said mixing step includes mixing 0.01–2%, on mol basis, of an additive selected from the group consisting of praseodymium, praseodymium sulfide, and mixtures thereof.

17. The process of claim 9 including an excess of elemental sulfur in excess of amount of sulfur that is necessary to form sulfides of germanium, gallium if present, and modifier.

18. The process of claim 14 wherein the glass has Tg greater than about 410° C.; thermal stability exceeding about 100° C., as measured by the difference between Tg and Tx; and transmission of radiation having wavelength of up to about 15 microns.

19. The process of claim 14 wherein the glass has $T_g$ of 410°–550° C.; thermal stability of 100°–300° C., as measured by the difference between $T_g$ and $T_x$; and transmission of radiation having wavelength of up to about 15 microns; said glass components are in elemental form.

20. The process of claim 15 wherein the glass has $T_g$ of 410°–550° C.; thermal stability of 100°–300° C., as measured by the difference between $T_g$ and $T_x$; and transmission of radiation having wavelength of up to about 15 microns; said glass components are in elemental form.

* * * * *